(12) United States Patent
Schultheiss et al.

(10) Patent No.: US 6,488,731 B2
(45) Date of Patent: Dec. 3, 2002

(54) PLEATED FILTER MADE OF A MULTI-LAYER FILTER MEDIUM

(75) Inventors: Wolfram Schultheiss, Weinheim (DE); Felix Herberg, Heppenheim (DE); Jörg Stöckler, Zürich (CH)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/810,584

(22) Filed: Mar. 16, 2001

(65) Prior Publication Data

US 2002/0011051 A1 Jan. 31, 2002

(30) Foreign Application Priority Data

Mar. 17, 2000 (DE) .......................... 100 13 315

(51) Int. Cl.⁷ ............................... B03C 3/011
(52) U.S. Cl. .................... 55/486; 55/487; 55/DIG. 5; 95/57; 95/78; 95/287; 96/15; 96/69; 15/347; 15/352; 264/DIG. 48
(58) Field of Search .................. 55/382, 528, 485, 55/486, 487, DIG. 2, DIG. 3, DIG. 39, 521; 95/57, 78, 286, 287; 96/15, 65, 66, 69; 15/347, 352; 264/DIG. 48; 428/340, 903; 442/389

(56) References Cited

U.S. PATENT DOCUMENTS

| | | | | |
|---|---|---|---|---|
| 5,647,881 A | * | 7/1997 | Zhang et al. | 55/DIG. 2 |
| 5,810,898 A | * | 9/1998 | Miller | 55/521 |
| 5,820,645 A | * | 10/1998 | Murphy, Jr. | 55/521 |
| 6,156,086 A | * | 12/2000 | Zhang | 55/DIG. 2 |
| 6,171,369 B1 | * | 1/2001 | Schultink et al. | 95/57 |
| 6,183,536 B1 | * | 2/2001 | Schultink et al. | 95/57 |

FOREIGN PATENT DOCUMENTS

EP 0 893 151 1/1999

* cited by examiner

Primary Examiner—David A. Simmons
Assistant Examiner—Minh-Chau T. Pham
(74) Attorney, Agent, or Firm—Kenyon & Kenyon

(57) ABSTRACT

The present invention relates to a pleated filter made of a multi-layer filter medium, including at least one filter paper layer having area weights of 30–100 g/m², a microfiber nonwoven fabric layer having area weights 5–120 g/m² and a support nonwoven fabric layer made of synthetic, polymeric fibers having area weights of 10–120 g/m². The layers of the pleated filter contain fused polymer areas by which the fabric layers are bonded to the paper layer, and by which the fabric layers are made firmer within themselves. When subject to a fractional efficiency test at an initial pressure difference of at most 180 Pa, at a boundary speed of approximately 2.62 m/s and a flow speed through the filter medium of approximately 0.13 m/s, the pleated filter is able to separate at least 90% of particles greater than 0.3 μm, at least 92% of particles greater than 0.5 μm, at least 93% of particles greater than 1 μm, and at least 97% of particles greater than 3 μm, as measured using the standard method DIN EN 60312 (IEC 60312) § 5.1.2.5.

9 Claims, No Drawings

PLEATED FILTER MADE OF A MULTI-LAYER FILTER MEDIUM

FIELD OF THE INVENTION

The present invention relates to a pleated filter made of a multi-layer filter medium.

BACKGROUND INFORMATION

So-called S-class or high efficiency particulate air (HEPA) filters made of pleated glass fiber paper are used for insertion into vacuum cleaners, room air purifiers and/or room air-conditioners. These glass fiber paper filters have a high efficiency, but they also have a number of disadvantages. For example, they have a very high air resistance. Associated with the high air resistance is a high tendency to clog up, and the low constancy in the rate of air flow or air circulation in vacuum cleaners, room air purifiers and/or room air-conditioners. The tendency of the glass fiber filters to clog causes each filter to have a short service life, which in turn results in high changing costs for the user. Furthermore, glass fiber paper filters cannot be incinerated and can break under mechanical stresses, with the result that broken pieces of glass fiber, injurious to health, can get into the clean air stream. Because of their high air resistance, glass fiber paper filters have to be folded very densely, so that a sufficiently large surface area is available for the passage of the air. In order to avoid loss of filter area through touching of the folds, spacers are necessary, which involve high costs of fabrication.

SUMMARY OF THE INVENTION

The object of the present invention is to specify a pleated filter which avoids the disadvantages of the known glass fiber paper filters.

According to the present invention, the object is achieved by a pleated filter which includes at least one filter paper layer with area weights of 30–100 g/m$^2$, a microfiber nonwoven fabric layer with area weights of 5–120 g/m$^2$ and a support nonwoven fabric layer made of synthetic polymeric fibers with area weights of 10–120 g/m$^2$. The layers of the pleated filter contain fused polymer areas by which the fabric layers are bonded to the paper layer, and by which the fabric layers are made firmer within themselves.

When subject to a fractional efficiency test at an initial pressure difference of at most 180 Pascal at a boundary speed of approximately 2.62 m/s and a flow speed through the filter medium of approximately 0.13 m/s, the pleated filter, according to the present invention, is able to separate (as measured using the standard method DIN EN 60312 (IEC 60312) § 5.1.2.5) at least 90% of particles greater than 0.3 $\mu$m in size, at least 92% of particles greater than 0.5 $\mu$m, at least 93% of particles greater than 1 $\mu$m, and at least 97% of particles greater than 3 $\mu$m.

The filter according to the present invention has a number of advantages. It has substantially lesser tendency to clog up, which provides a higher constancy in the rate of air flow or air circulation in room air purifiers and/or room air-conditioners. It also has a longer service life, which results in lower changing costs for the user. In addition, because the filter medium, according to the present invention, is made of synthetic or cellulose fiber, broken pieces of glass fiber do not find their way into the clean air stream. The filter medium can also be incinerated.

DESCRIPTION OF THE INVENTION

In an exemplary embodiment, the filter is one in which the filter paper layer has area weights of 30–70 g/m$^2$, the microfiber nonwoven fabric layer has area weights of 20–80 g/m$^2$, and the support nonwoven fabric layer has area weights of 10–60 g/m$^2$. When subject to a fractional efficiency test at an initial pressure difference of at most 180 Pascal at a boundary speed of approximately 2.62 m/s and a flow speed through the filter medium of 0.13 m/s, the pleated filter is able to separate (as measured using the standard method DIN EN 60312 (IEC 60312) § 5.1.2.5) at least 95% of particles greater than 0.3 $\mu$m, at least 97% of particles greater than 0.5 $\mu$m, at least 98% of the particles greater than 1 $\mu$m and at least 99% of the particles of a size of at least 3 $\mu$m. Because of the low pressure resistance of the filter medium, the distance between the folds can be increased. No spacers are required, since the danger of folds touching one another does not exist. This allows a reduction in fabricating costs.

In an exemplary embodiment, the microfiber nonwoven fabric is one produced by a meltblown, jetspin or electrostatic spinning process. The corresponding microfiber nonwoven fabrics have a high dust separation capability, since the fiber diameter of the microfibers or filaments is less than 10 $\mu$m.

In another exemplary embodiment, the support nonwoven fabric layer is made of polypropylene, polyester, polyacrylonitrile, and/or polyamide fibers or filaments. The fibers or filaments are bonded in the form of a wet laid nonwoven, spunbonded nonwoven or dry laid nonwoven, using thermal and/or chemical bonding. Such support nonwoven fabrics display high mechanical strength values.

To improve the degree of separation, an additional pre-filter layer of a microfiber nonwoven fabric material may be provided.

In another exemplary embodiment, the individual filter layers have different porosities. The use of individual filter layers having different porosities permits a build-up of dust cake and makes possible the separation of the finest dust particles, while avoiding a rapid increase of the resistance to air flow through the filter medium.

In another exemplary embodiment, the microfiber nonwoven fabric layer have a higher porosity than the paper filter layer.

To improve the dust separation performance of the filter according to the present invention, the microfiber nonwoven fabric layer may be charged electrostatically. The filter according to the present invention is preferably inserted in such a way, that the paper filter layer points to the dust-laden air side. However, the air flow through the filter medium can also occur in the opposite direction.

In another example embodiment, the filter is framed by injection molding material, nonwoven fabric and/or cardboard. The framed filter may be used for upstream or downstream filtration by vacuum cleaners, room air purifiers or air-conditioners. The very small pressure difference of at most 180 Pascal permits a high suction performance by the vacuum cleaner, the room air purifier or the room air-conditioner, or a high constancy of air flow or air circulation.

The filter according to the present invention, may be used in vacuum cleaners in combination with vacuum cleaner filter bags, such as the filter bags known from the document European Patent A 893 151. The use of the filter obtains degrees of separation which exceed the degree of separation previously described.

The following two examples illustrate the principles of the invention but do not limit the present invention.

EXAMPLE 1

A filter, made of a paper filter layer with an area weight of about 50 g/m$^2$, an electrostatically charged propylene microfiber nonwoven fabric layer of about 20 g/m² and a propylene spunbonded nonwoven fabric of about 15 g/m² is laminated to a filter medium having an area weight of 85±10 g/m², and a thickness of 0.6±1 mm. The filter has an air permeability as per DIN 53438, at a pressure of 2 mbar, at an air flow rate greater than 200 l/m²/s. A filter with the dimensions 260×180×17 mm was tested using the standard method DIN 71460, part 1. The test volume stream was 120 m³/h at a boundary speed of approximately 2.62 m/s and a flow speed of approximately 0.13 m/s through the filter medium. Table 1 displays the results of the testing at an initial pressure difference of 173 Pascal.

TABLE 1

| Particle Size | Dust-Laden Gas Sampling | | | Cleaned Gas Sampling | | | Fractional Efficiency | | | |
|---|---|---|---|---|---|---|---|---|---|---|
| Diameter (μm) | 1(n) | 2(n) | 3(n) | 1(n) | 2(n) | 3(n) | 1(%) | 2(%) | 3(%) | Xg(%) |
| >0.30 | 88027 | 87241 | 90322 | 4268 | 3892 | 4410 | 95 | 95 | 95 | 95 |
| >0.50 | 34168 | 33805 | 35514 | 850 | 841 | 945 | 97 | 97 | 97 | 97 |
| >1.00 | 20373 | 20264 | 21161 | 356 | 327 | 401 | 98 | 98 | 98 | 98 |
| >3.00 | 753 | 748 | 748 | 4 | 1 | 1 | 99 | 99 | 99 | 99 |
| >6.00 | 48 | 46 | 49 | 0 | 0 | 0 | 100 | 100 | 100 | 100 |
| >10.00 | 25 | 21 | 25 | 0 | 0 | 0 | 100 | 100 | 100 | 100 |
| Pressure Difference In (Pa) | 172 | 173 | 172 | 173 | 173 | 172 | | | | |
| Measuring Period (s) | 60 | 60 | 60 | 60 | 60 | 60 | | | | |
| Particle Count (1/l) | 88027 | 87241 | 90322 | 4268 | 3892 | 4410 | | | | |

EXAMPLE 2

In contrast, a glass fiber filter paper with dimensions 260×180×17 mm was tested under the same conditions. Table 2 displays the result of the testing at initial pressure difference of 487 Pascal.

TABLE 2

| Particle Size | DustLaden Gas Sampling | | | Cleaned Gas Sampling | | | Fractional Efficiency | | | |
|---|---|---|---|---|---|---|---|---|---|---|
| Diameter (um) | 1(n) | 2(n) | 3(n) | 1(n) | 2(n) | 3(n) | 1(%) | 2(%) | 3(%) | Xg(%) |
| >0.30 | 90974 | 97190 | 96705 | 194 | 360 | 453 | 99 | 99 | 99 | 99 |
| >0.50 | 32046 | 35192 | 35933 | 70 | 78 | 75 | 99 | 99 | 99 | 99 |
| >1.00 | 17893 | 19942 | 20736 | 28 | 38 | 42 | 99 | 99 | 99 | 99 |
| >3.00 | 296 | 352 | 405 | 0 | 2 | 0 | 100 | 99 | 100 | 99 |
| >6.00 | 23 | 27 | 33 | 0 | 2 | 0 | 100 | 92 | 100 | 97 |
| >10.00 | 11 | 15 | 18 | 0 | 1 | 0 | 100 | 93 | 100 | 97 |
| Pressure Difference In (Pa) | 488 | 489 | 489 | 488 | 488 | 490 | | | | |
| Measuring Period (s) | 60 | 60 | 60 | 60 | 60 | 60 | | | | |
| Particle Count (1/l) | 90974 | 97190 | 96705 | 194 | 360 | 453 | | | | |

The examples show that good separation performance is achieved by the filter according to the present invention, at a substantially lower initial pressure difference.

What is claimed is:

1. A pleated filter made of a multi-layer filter medium, comprising:
    at least one filter paper layer having area weights of 30 to 100 g/m²;
    at least one microfiber nonwoven fabric layer having area weights of 5 to 120 g/m²;
    at least one support nonwoven fabric layer of synthetic, polymeric fibers having area weights of 10 to 120 g/m²;
    at least one fused polymer area contained within the fabric layers, the fused polymer area bonding the fabric layers to the paper layer, and making the fabric layers firmer within themselves; and when subject to a fractional efficiency test at an initial pressure difference of at most 180 Pa, at a boundary speed of approximately 2.62 m/s and a flow speed through the filter medium of approximately 0.13 m/s, the pleated filter is able to separate, as measured using the standard method DIN EN 60312 (IEC 60312) § 5.1.2.5, at least 90% of particles greater than 0.3 μm, at least 92% of particles greater than 0.5 μm, at least 93% of particles greater than 1 μm, and at least 97% of particles greater than 3 μm.

2. The pleated filter according to claim 1, wherein the filter paper layer has area weights of 30 to 70 g/m², the microfiber nonwoven fabric has area weights of 20 to 80 g/m², and the support nonwoven fabric has area weights of 10 to 60 g/m², and when subject to a fractional efficiency test at an initial pressure difference of at most 180 Pa, at a boundary speed of approximately 2.62 m/s and a flow speed through the filter medium of approximately 0.13 m/s, the pleated filter is able to separate, as measured using the standard method DIN EN 60312 (IEC 60312) § 5.1.2.5, at least 95% of particles greater than 0.3 μm, at least 97% of particles greater than 0.5 μm, at least 98% of particles greater than 1 μm, and at least 99% of particles greater than 3 μm.

3. The filter according to claim 1, wherein the microfiber nonwoven fabric layer is one that is produced by a melt-blown, jet-spin or electrostatic spinning process.

4. The filter according to claim 1, wherein the support nonwoven fabric layer is made of polypropylene, polyester, polyacrylonitrile and/or polyamide fibers or filaments, which are bonded in the form of a wet laid nonwoven, spunbonded nonwoven or dry laid nonwoven, using thermal and/or chemical bonding.

5. The filter according to claim 1, wherein an additional prefilter layer made of a microfiber nonwoven fabric is provided.

6. The filter according to claim 1, wherein the individual layers have different porosities.

7. The filter according to claim 1, wherein the microfiber nonwoven fabric layer has a higher porosity than the paper filter layer.

8. The filter according to claim 1, wherein the microfiber nonwoven fabric layer is charged electrostatically.

9. The filter according to claim 1, wherein the pleated filter is framed by injection molding material, nonwoven fabric and/or cardboard, and is used for upstream or downstream filtration by vacuum cleaners, room air purifiers and/or room air-conditioners.

* * * * *